United States Patent [19]
Shafe'

[11] Patent Number: 5,918,068
[45] Date of Patent: Jun. 29, 1999

[54] RECONFIGURABLE INTERFACE FOR SMALL DISK DRIVES

[75] Inventor: Mathew Kayhan Shafe', Campbell, Calif.

[73] Assignee: International Business Machines Corporation, Armonk, N.Y.

[21] Appl. No.: 08/882,018

[22] Filed: Jun. 3, 1997

Related U.S. Application Data

[63] Continuation of application No. 08/363,464, Dec. 23, 1994, abandoned.

[51] Int. Cl.⁶ .................................................. G06F 13/00
[52] U.S. Cl. ........................... 395/831; 385/427; 385/285
[58] Field of Search ................................. 395/427, 428, 395/438, 700, 280, 285, 821, 828, 831

[56] References Cited

U.S. PATENT DOCUMENTS

| | | | |
|---|---|---|---|
| 4,651,237 | 3/1987 | Williams | 360/48 |
| 4,737,975 | 4/1988 | Shafer | 379/58 |
| 4,866,601 | 9/1989 | DuLac et al. | 364/200 |
| 4,899,306 | 2/1990 | Greer | 364/900 |
| 5,111,423 | 5/1992 | Kopec, Jr. et al. | 395/500 |
| 5,121,342 | 6/1992 | Szymborski et al. | 364/514 |
| 5,150,048 | 9/1992 | McAuliffe et al. | 324/158 R |
| 5,243,273 | 9/1993 | McAuliffe et al. | 324/158 R |
| 5,335,352 | 8/1994 | Yanai et al. | 395/800 |
| 5,519,851 | 5/1996 | Bender et al. | 395/500 |
| 5,581,715 | 12/1996 | Verinsky et al. | 395/309 |

FOREIGN PATENT DOCUMENTS

| | | | |
|---|---|---|---|
| 185098 | 5/1985 | European Pat. Off. | G06F 13/12 |
| WO94/29852 | 12/1994 | WIPO | G11B 5/12 |

OTHER PUBLICATIONS

Messmer, Hans–Peter, "Indispensable PC Hardware Book, Your Hardware Questions Answered", Second Edition, 1993.

*Primary Examiner*—Ayaz R. Sheikh
*Assistant Examiner*—Jigar Pancholi
*Attorney, Agent, or Firm*—Ingrid M. Foester; Monica D. Lee; David W. Victor

[57] ABSTRACT

An electronic circuit apparatus is provided for electronic circuits and devices, comprising a component disk drive, a disk controller, and a programmable interface for dynamically adapting the component drive to communicate over a predetermined bus architecture to an external application. The interface is programmed by the disk controller using one of a library of microcode sets stored on the component drive. Alternatively, a microprocessor independent of the disk controller programs the interface from microcode stored in solid state memory. In an alternative embodiment, the apparatus further comprises an application circuit and the programmable interface adapts the component drive for use by the circuit. In another embodiment, the apparatus comprises a subcircuit that communicates with an external application over a predetermined bus architecture, and the programmable interface adapts the subcircuit for such communication.

58 Claims, 7 Drawing Sheets

RECONFIGURABLE INTERFACE FOR SMALL DISK DRIVES

This application is a continuation of Ser. No. 08/363,464 Dec. 23, 1994.

FIELD OF THE INVENTION

The present invention relates generally to magnetic disk drive interfaces, and more particularly to an electronic circuit architecture including a component-sized disk drive and electronically configurable interface.

BACKGROUND OF THE INVENTION

Magnetic disk drives have been used broadly as peripheral storage devices. As disk drives grow smaller, they are also becoming practical as a cost-effective replacement for solid state memory in a variety of electronic devices, e.g. cameras, fax machines, cellular phones, modems, pagers, handheld computing devices, printers, and copiers.

Magnetic disk drives and other peripheral devices are generally designed to meet one of a number of industry standard bus architectures to assure compatibility with a host system. These include, for example, the small computer serial interface (SCSI), serial storage architecture (SSA) and the integrated drive electronics (IDE) interface. Each type of peripheral bus architecture defines its own unique set of communication protocols. The host system, which may include a microprocessor, memory devices, and other circuits, communicates with these elements via a system bus. The system bus may comprise an industry standard architecture (ISA) bus, or a microchannel, for example. The system bus similarly has its own set of communications protocols. As such, the host system requires a device adapter to interface between the system bus and the peripheral bus.

An electronic circuit implementing a component-sized magnetic disk drive in lieu of solid state memory must also provide means for allowing the disk drive to communicate with the circuit application. Moreover, the circuit may be housed in a card enclosure and plugged into an application external to the circuit. It then requires means for interfacing with the external application.

For example, circuits embodying fax machines, modems, or disk drives, and circuits related to the operation of cellular phones and cameras are presently being housed in credit-card sized formats of predefined dimensions that plug into a compatible socket of a computing device. Three standard formats that have emerged for such credit-card-type applications are the PCMCIA formats. A "type III" card measures 10.5 mm in height, 85.6 mm in length and 54 mm in width. The dimensions of a "type II" card are approximately 5 mm high×85.6 mm long×54 mm wide. A "type I" card is a modest 3.3 mm high×85.6 mm long×54 mm wide. A PCMCIA card includes a PCMCIA bus for communicating with the computing device. Thus circuit applications residing in PCMCIA-type cards will include some type of interface to the PCMCIA bus.

Some electronic devices are incorporated into a communication network, e.g. via a phone line. These devices must conform to industry standard communications protocols such as asynchronous transfer mode (ATM), integrated services digital networks (ISDN), RS-232, RS-422, V.35, and V.42. Wireless communications devices such as cellular phones and electronic pagers must also be adapted to meet industry standard communications protocols. Computer peripherals such as printers and printed circuit cards similarly require means for interfacing to the host system. Each of these circuit application is a candidate for implementing a component disk drive in lieu of solid state memory, and as such, would require a customized interface between the disk drive and the application.

To add flexibility to an electronic device incorporating a component disk drive, it is desirable to include an adaptable interface within the device circuit, enabling it to conform to more than one communication or host system protocol. A number of U.S. patents discuss the use of an adaptable interface between two systems having different communications protocols. For example, U.S. Pat. No. 5,111,423 discloses a programmable interface, i.e. an EEPROM, inserted between a printed circuit card and a host system that is configurable for adapting a variety of printed circuit card applications to the same host system. U.S. Pat. No. 4,899,306 describes a test interface circuit having an adaptable interface, i.e. random access memory, for adapting the test circuit to different types of host systems. Another testing device with an adaptable interface comprising programmable gate arrays is described in U.S. Pat. No. 5,121,342. The testing device includes a microprocessor for receiving downloaded software from a removable floppy peripheral disk drive device and for selectively configuring the programmable gate arrays to a variety of communication protocols (e.g. RS-232, RS-422, V.35 and ISDN). U.S. Pat. No. 5,243,273 describes a testing device for serial communications cards that is configurable to a plurality of communications protocols.

However, to date, an electronic circuit apparatus has not been implemented that includes a component-level disk drive in lieu of solid state memory or an external floppy drive, and further comprises a programmable interface for adapting the electronic circuit to different types of communication protocols.

SUMMARY OF THE INVENTION

A primary object of the present invention is to provide a component disk drive that provides local storage for an electronic circuit in lieu of solid state memory, and a programmable interface for adapting the component drive to the electronic circuit.

Another object of the present invention is to provide an electronic device comprising a component disk drive, an electronic circuit implementing the component disk drive in lieu of solid state memory as local storage, and a programmable interface provided therebetween for allowing the component drive to communicate with the circuit.

Another object of the present invention is to provide an electronic device that communicates with an application external to the device, comprising a component disk drive, an electronic circuit, and a programmable interface provided between the electronic circuit and the external application to enable communication therebetween.

Another object of the present invention is to provide a card-based electronic device having an electronic circuit, a component disk drive, and a programmable interface for adapting the component drive to the electronic circuit, e.g. for PCMCIA-type formats.

Accordingly, a first embodiment of the present invention is an electronic apparatus comprising a component disk drive for use as local storage by an electronic circuit in lieu of solid state memory, a hard disk controller (HDC) for controlling the low level operations of the drive, and a programmable interface for enabling communication between the component drive and the electronic circuit. The interface is programmed by the HDC. Alternatively, a simple central processing unit is provided in the apparatus for configuring the interface. The HDC resides in the component disk drive, in an integrated circuit chip external to the component drive, or within the programmable logic unit (i.e., the PLU is a microprocessor with programmable functions). The microcode used for programming the interface is stored in the component drive. Alternatively, a solid state memory component is provided in the apparatus for storing the microcode.

A second embodiment of the present invention is an electronic device comprising a component disk drive, an electronic circuit implementing the component disk drive in lieu of solid state memory as local storage, and a programmable interface provided therebetween for allowing the component drive to communicate with the circuit.

A third embodiment of the present invention comprises an electronic device that communicates with an application external to the device, comprising a component disk drive, an electronic circuit, and a programmable interface provided between the electronic circuit and the external application to enable communication therebetween.

Each of the embodiments disclosed may be housed in a card-type enclosure such as a PCMCIA-type card.

The component disk drive preferably comprises a single disk with a diameter of no more than 1.3 inches and a single recording surface mounted directly to a rotatable flat motor having a diameter of up to 1.3 inches. The component drive further comprises a single suspension carrying at least one transducer for writing and retrieving data from the disk, and a parking zone at the center of the recording surface for parking the transducer during periods of inactivity or non-operation to provide high shock resistance.

BRIEF DESCRIPTION OF THE DRAWING

The foregoing and other objects, features and advantages of the present invention will be apparent from the following detailed description of the preferred embodiments of the invention, and from the accompanying figures of the drawing.

DESCRIPTION OF THE PREFERRED EMBODIMENT

Figure 1:
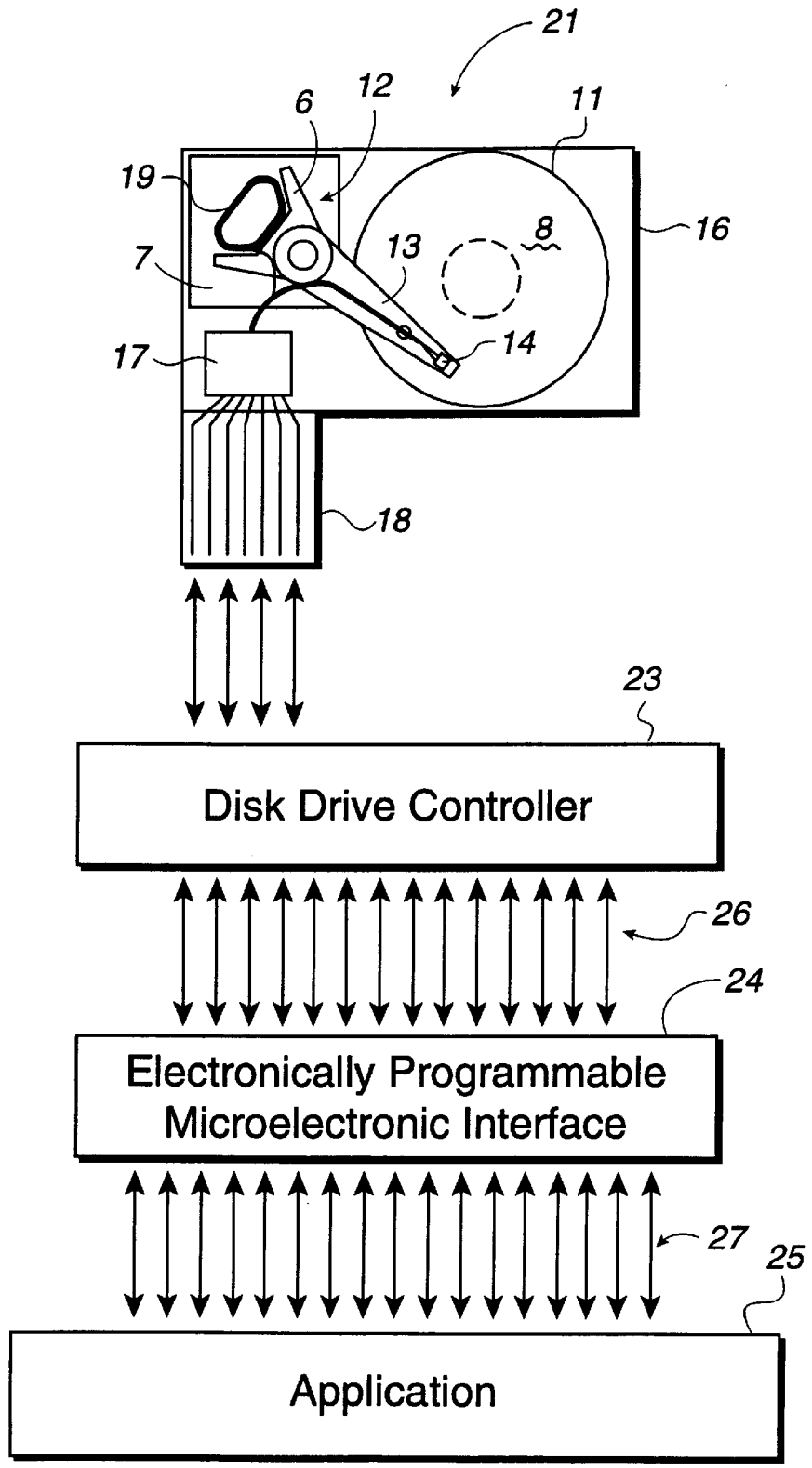
FIGS. 1(a) and 1(b) are functional block diagrams of the electronic circuit apparatus according to the present invention.
Figure 1:
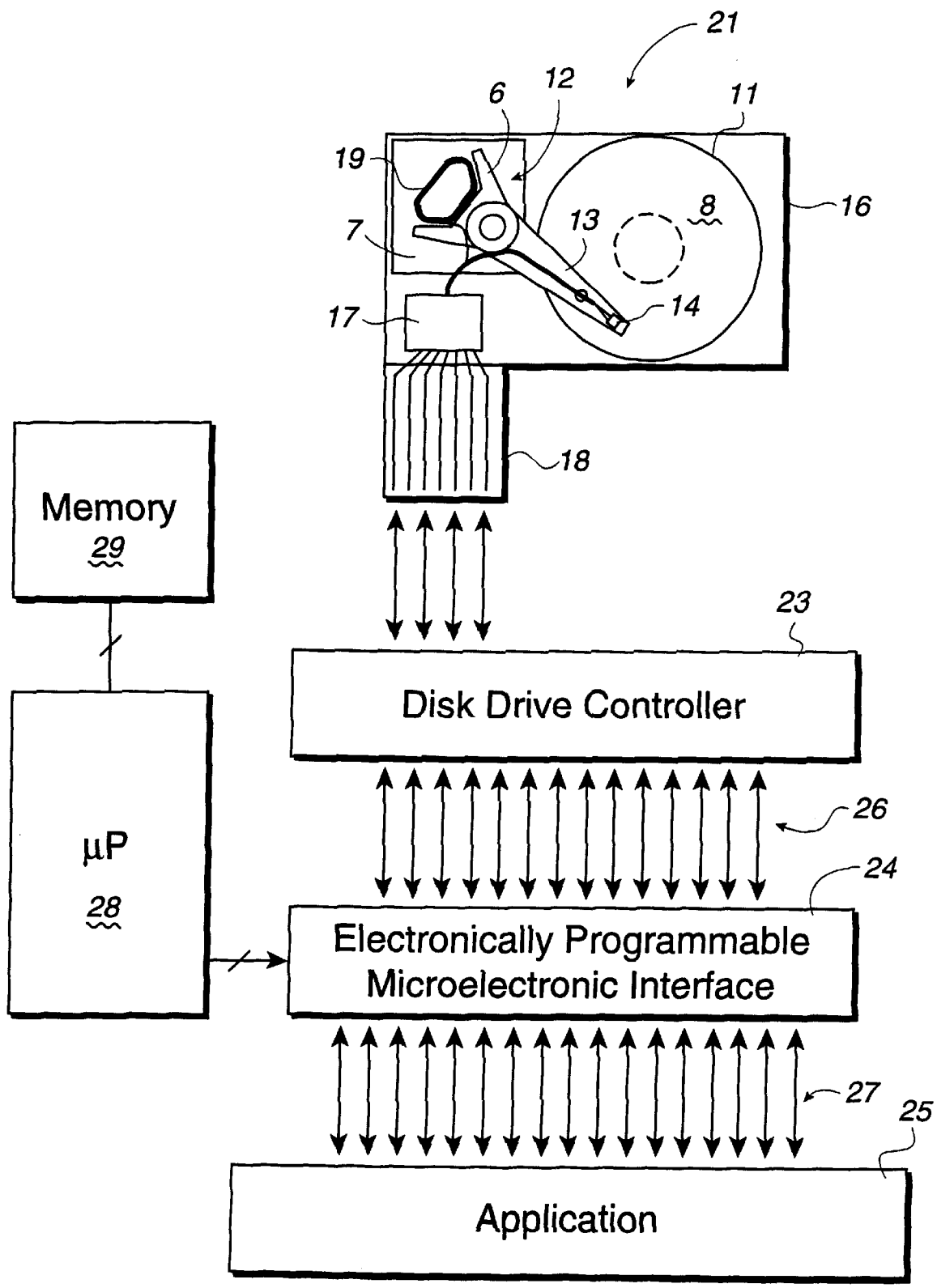

The present invention will now be described with reference to FIG. 1(a), which is a functional block diagram of the proposed electronic circuit apparatus. It comprises a component disk drive 21, a disk drive controller 23 (also commonly referred to as a hard disk controller or HDC), and an electronically programmable microelectronic interface 24 for adapting the component disk drive 21 and controller 23 to an application 25.

A disk drive generally comprises a disk 11 having at least one recording surface 8 for storing information, means such as a motor (not shown) for rotating the disk, an actuator assembly 12, arm electronics 17, and a housing 16. The actuator assembly 12 generally comprises a voice coil motor (VCM), an actuator arm 6, and at least one suspension 13 connected to the arm 6 and supporting a transducer 14 the recording surfaces 8 of the disk 11. The transducer 14 is held in close proximity to the disk surface by the combination of a downward force (relative to the disk surface) from the suspension 13 and an upward force caused by air flow generated from the rotation of the disk 11. If the downward force exceeds the upward force, the transducer will come into contact with the disk surface.

The VCM comprises an inductive coil 19 disposed between an upper magnet (not shown) and a lower magnetic plate 7. The arm electronics 17 transmits electrical positioning current to the coil 19. The current signal induces a magnetic flux around the coil for repulsing and attracting the magnet and magnetic plate 7. The repulsing and attracting forces provide movement of the actuator arm in a plane substantially parallel to the recording surface 8, causing the suspension 13 to move along an arcuate path over the surface 8.

Data is generally recorded on concentric tracks of the recording surface 8. The disk region or track having the largest diameter is referred to as the outer diameter (OD) of the disk, and the region or track nearest to the hub and having the smallest diameter is referred to as the inner diameter (ID). Data to be stored on the disk 11 is first "encoded" by a read/write channel residing, e.g., in the disk drive controller 23. The data is encoded into a form suitable for the storage medium, then transmitted via a flex cable or other connector means 18 to the arm electronics 17 and then on to the transducer 14 for writing to the disk. For example, in a magnetic disk drive, digital data is encoded into a series of pulses. As is known in the art, the pulses are transmitted in the form of a current to the transducer, and cause a fluctuating magnetic field at the transducer pole tip that affects the magnetization of discrete regions on the disk surface. When a transducer senses or "reads" information from the disk, the data is transmitted in encoded form via the arm electronics 17 to the channel for "decoding". The arm electronics usually include means for amplifying and synchronizing the read signal.

The motor is fixedly attached to the disk 11. It may be encased in a hub, in which case the rotational force of the motor is translated to the hub and from the hub to the disk 11.

To protect a rotary disk drive from external forces during operation or movement, means may be implemented to park the transducer 14 when the disk is not operating and/or during periods of inactivity (i.e. times when data is not being written to or retrieved from the disk). Such means may include, for example, a load/unload ramp at the OD or a parking zone located at the ID.

As those skilled in the art of disk drive design will understand, the disk drive controller (HDC) 23 includes logic to control certain functions of the component drive 21. The HDC also serves as an intermediary interface between the component disk drive 21 and the programmable interface 23. Functions of the HDC 23 include, for example, servo control, data, address and command buffers, drive motor controls, and a read/write channel for coding and decoding data.

Typically, the HDC 23 is a function residing in one or more solid state die components dedicated to disk drive control functions and residing external to the disk drive 21. Preferably, all functions are contained within a single custom chip. The HDC 23 may alternatively be integrated with the arm electronics 17 and reside within the disk drive enclosure 16 or external to the drive. It may also be merged with the programmable interface 24. For example, the Xilinx XC40000 processor is entirely programmable and may include a simple microcontroller and drive interface electronics as well as other functions. A custom hybrid-type die could also be provided, comprising a gate array having a normal, non-programmable CMOS for the HDC function, and programmable gates like the XC4000 as the PLU. This would minimize the cost of having an entire die of programmable gates permanently dedicated to the HDC function and make more programmable gates available to the PLU application coexisting on the die.

The programmable interface 24 comprises a programmable logic unit (PLU) of some kind, e.g. a field programmable gate array (FPGA), programmable array logic (PAL), or a programmable logic device (PLD). It communicates with the HDC over a bus 26. The particular PLU implemented in the electronic circuit apparatus of the present invention will be determined by the type of application that the PLU is interfaced to. For example, if the interface 24 is to a communications network with a communications protocol such as RS-232 or ISDN, the PLU of choice may be a programmable gate array such as the one described in U.S. Pat. No. 5,121,342.

As is well known in the art, a PLU is generally programmed by some kind of microprocessor. The processor receives a microcode set corresponding to a desired PLU function from local storage. The microcode set comprises both programming instructions and specifications. In the electronic circuit apparatus of FIG. 1(a), the HDC 23 serves as the programming processor of the PLU 24 and the component disk drive 21 provides local storage for one or a library of microcode sets. This arrangement enables dynamic programming of the interface. Alternatively, a simple processor 28 such as an Intel 80186 16-bit controller, and a solid state memory component 29 (e.g. SRAM, EEPROM, flash memory, etc.), are provided, as shown in FIG. 1(b). The microprocessor 28 is coupled directly to the PLU 24 and receives the microcode set from the memory component 29, which may contain a library of microcode sets. The microprocessor may only be temporarily coupled to the PLU 24 in a manufacturing step, or may be a permanent component of the apparatus to enable on the fly programming. Yet another alternative is to use a PLU that includes some basic microprocessing functions, enabling the PLU to essentially program itself from microcode provided by internal memory, external memory, or the component drive.

Programming instructions for the PLU are either selected from a library of functions associated with that device, or are specially designed for a non-standard function according to methods presently known in the art. More Detailed information on PLU programming may be obtained by referring to "The Programmable Logic Data Book", a 1994 product guide and data book publicly available from Xilinx Inc., of San Jose, Calif.

The application 25 may be any of a number of devices. For example, it may be an element of a communications network that follows one of the standard communications protocols (e.g. RS-232, V.35, ISDN). It may be a computing device with a SCSI or IDE bus. It may be an electronic circuit application of an electronic device with a nonstandard bus communications protocol. The PLU 24 communicates with the application over bus 27.

Figure 2:
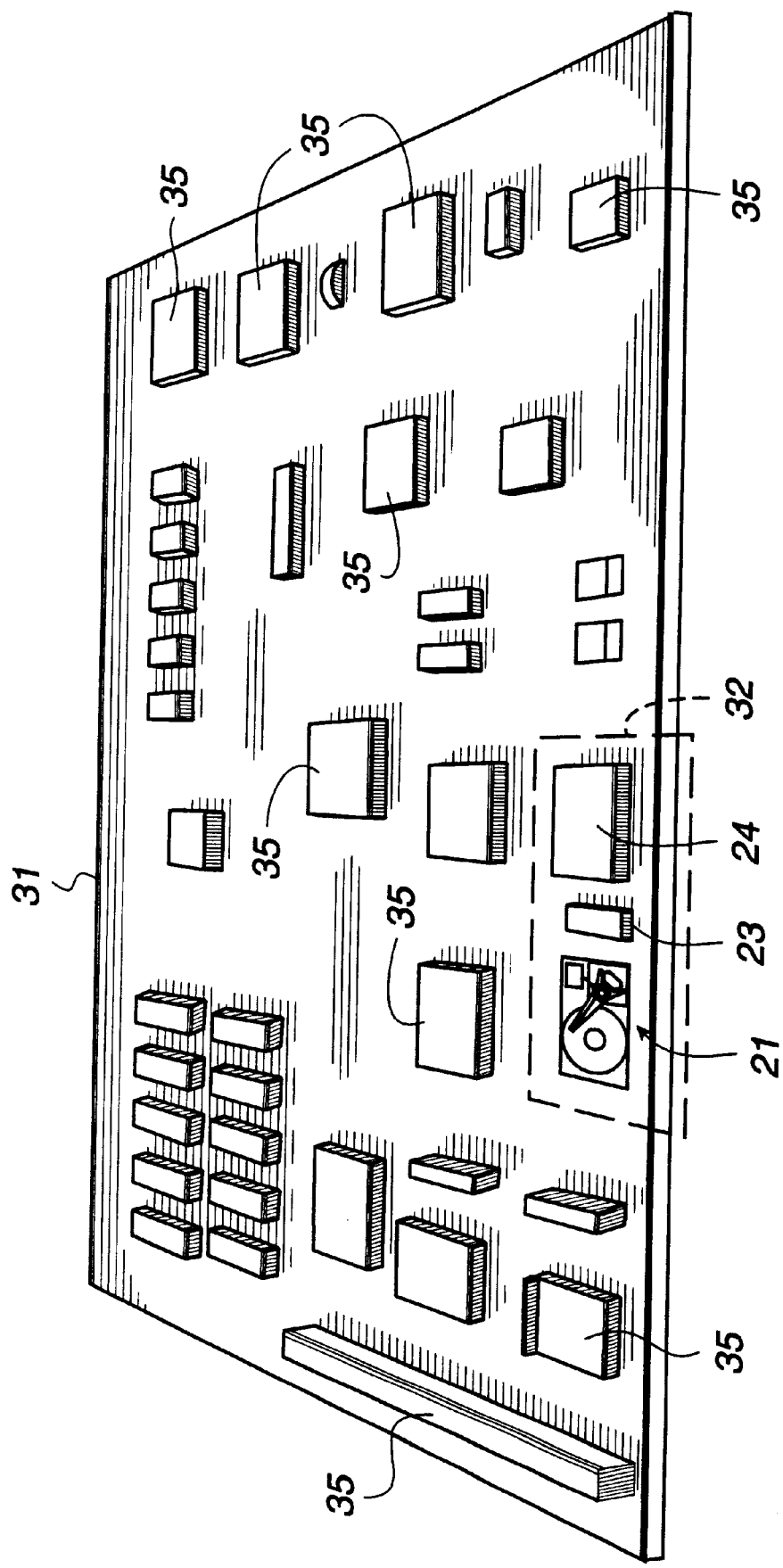
FIG. 2 is the electronic circuit apparatus of the present invention residing on an electronic circuit board.

FIG. 2 represents one possible implementation of the electronic circuit apparatus of the present invention. A general electronic circuit board 4 is shown, representative of circuit boards found in a variety of electronic devices. It includes an electronic circuit, comprising a plurality of interconnected circuit elements 35, e.g. integrated circuits, resistors, capacitors, oscillators, etc. The solid state components comprise, for example, a microprocessor, memory, an arithmetic logic unit, a programmable logic unit, etc. The apparatus of the present invention is also included on the circuit board, and is highlighted by dashed lines 23. It comprises a discrete, component-sized disk drive 21, a disk drive controller 23, and a PLU 24. The PLU 24 of the implementation shown is configured to adapt the component drive 21 to the electronic circuit's bus architecture, so that the component drive will appear to the circuit as solid state memory. Thus the component drive 21 provides local storage to the circuit for storing information used in the normal operation of the circuit.

A circuit board such as that represented in FIG. 1 may reside, for example, in a personal computer, a laptop, or other computing device, wherein the communications bus has an SSA architecture. It may also reside in devices peripheral to a computing device, e.g. controller cards for larger disk drives, printers, modems, and fax-modems. A circuit board is often present in electronic devices such as video cameras, fax machines, cellular phones, electronic pagers, photocopiers, and remote control devices, which may have nonstandard bus architectures. All of these are likely to have electronic circuits with some local storage requirements.

Figure 3:
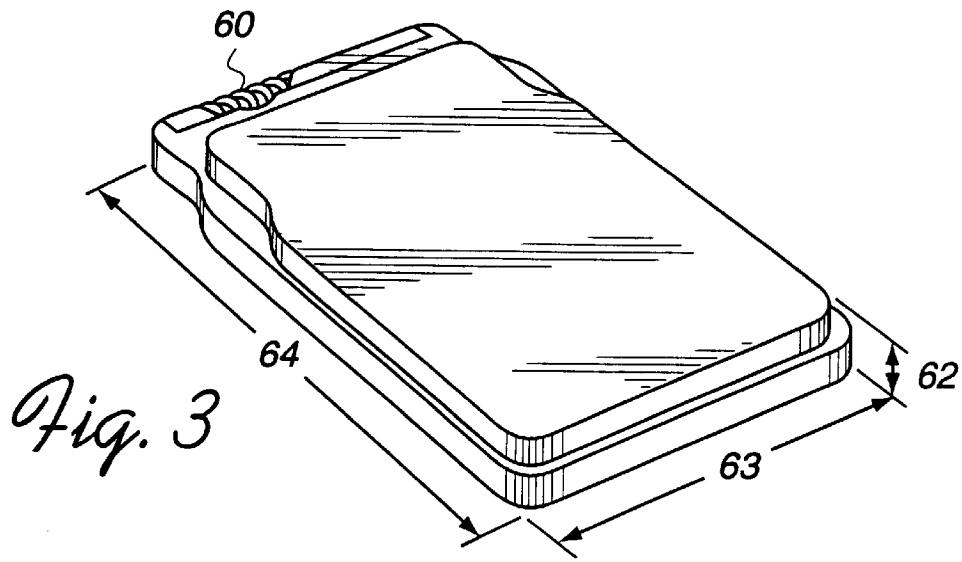
FIG. 3 is a perspective view of a general card-type electronic circuit enclosure.

FIG. 3 is representative of a card enclosure for an electronic circuit, adapted to be plugged into a compatible computer slot at connector 60. It may, for example, be a PCMCIA card type I, II or III having a predefined length 64, width 63, and height 62. The card thickness 62 is generally the most critical dimension of a card enclosure.

Figure 4:
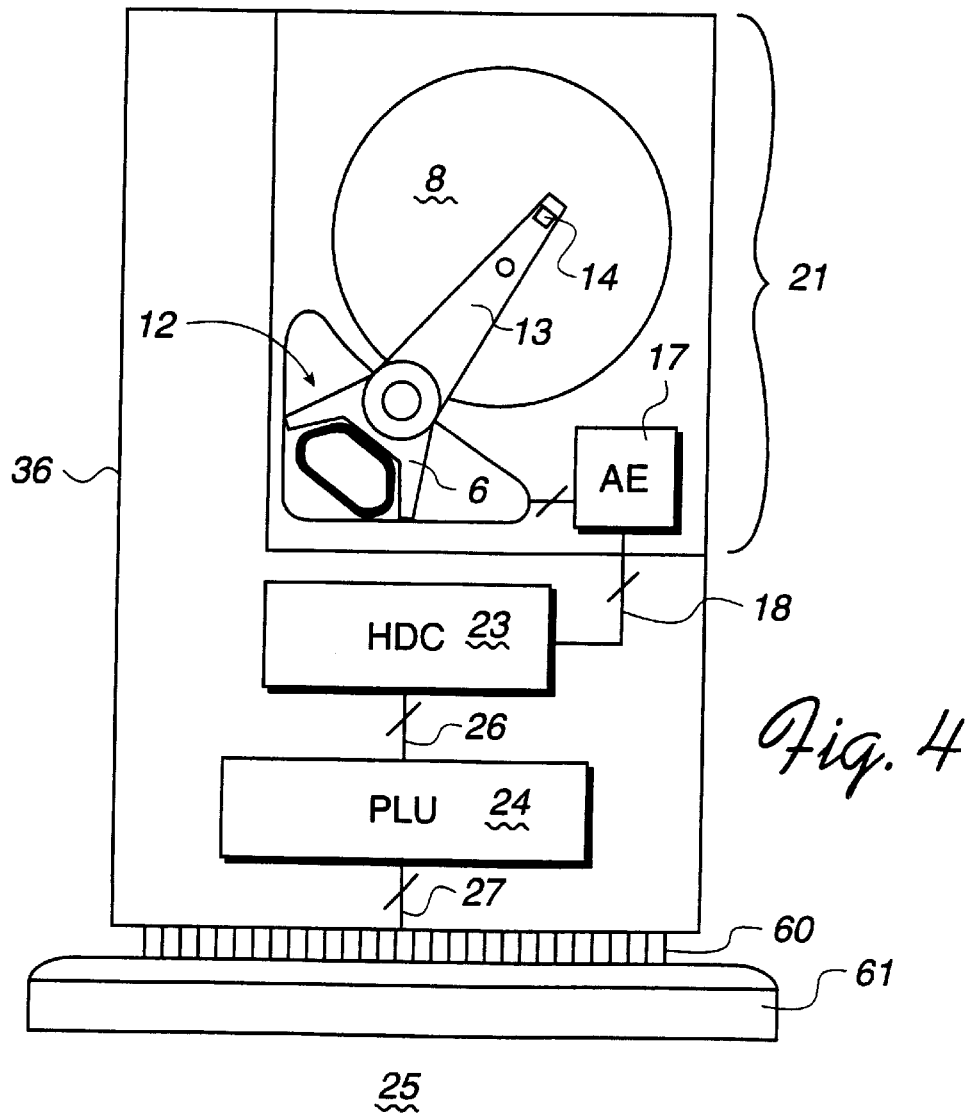
FIG. 4 is a first embodiment of the electronic circuit apparatus of the present invention in a card enclosure.

FIG. 4 shows the preferred embodiment of the electronic circuit apparatus of the present invention, wherein a component disk drive 21, an HDC chip 23 containing an AMD AM80C186 microprocessor, and a PLU 24, e.g. a Xilinx XC4000, are housed in a card-type enclosure 36. A digital clocking signal is distributed throughout the device along with power (not shown). A library of microcode sets defining a plurality of PLU interface configurations is stored on the component drive 21. The card enclosure preferably comprises a PCMCIA type II or type III card. The PLU 24 is configured to interface to an application 25 external to the card enclosure 36 and adapted to communicate over a PCMCIA bus. The physical interface between the card enclosure 36 and the application 25 comprises card connector 60 and a compatible socket 61 on the application 25.

FIGS. 5(a)–5(d) show the component disk drive assembly of the preferred circuit architecture according to the present invention. The drive comprises a disk 11, a motor 44, an actuator assembly 12, arm electronics 17, and a housing 16. The disk 11 is preferably magnetic and includes one recording surface 8 with a substantially planar region 55 at its center. It is preferably mounted directly to a flat motor 53 along its non-recording surface 9 by some appropriate means, e.g. mechanically, or by applying a bonding agent along the interface between the motor 53 and surface 9. Use of a single recording surface 8 and direct platter mounting allows a wider, thinner motor 53 to be used than would be feasible for a disk having two recording surfaces. The diameter of the motor 53 may be as large or larger than the diameter of the disk 11 itself. The advantages of this type of motor 53 will be described in further detail below.

The actuator assembly comprises a voice coil motor, an actuator arm 6, a single suspension 13 and a transducer 14 supported on an air-bearing slider. Preferably, the transducer 14 is a magnetoresistive (MR) head, allowing greater data capacity. Magnetoresistive heads are known in the disk drive industry and are preferred because their high sensitivity enables greater areal density (i.e. bits per inch) than conventional inductive heads. Using a state of the art magnetoresistive head in the preferred embodiment provides useful data storage capacity for applications requiring moderate data storage. However, it will be understood that other types of transducers may also be implemented. Moreover, the disk drive may be adapted to include a plurality of transducers 14 on suspension 13.

Figure 5A:
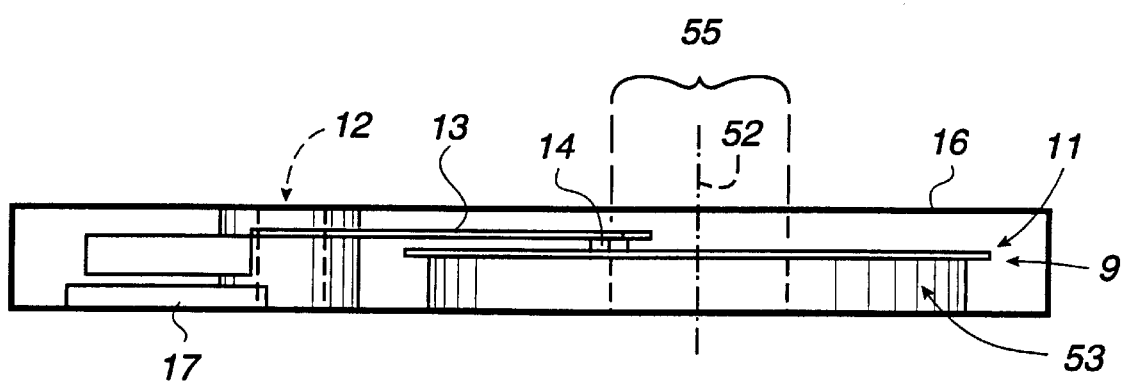
FIGS. 5(a)–5(d) show side and top views of the component disk drive for use in the preferred embodiment of the electronic circuit apparatus of the present invention
Figure 5B:
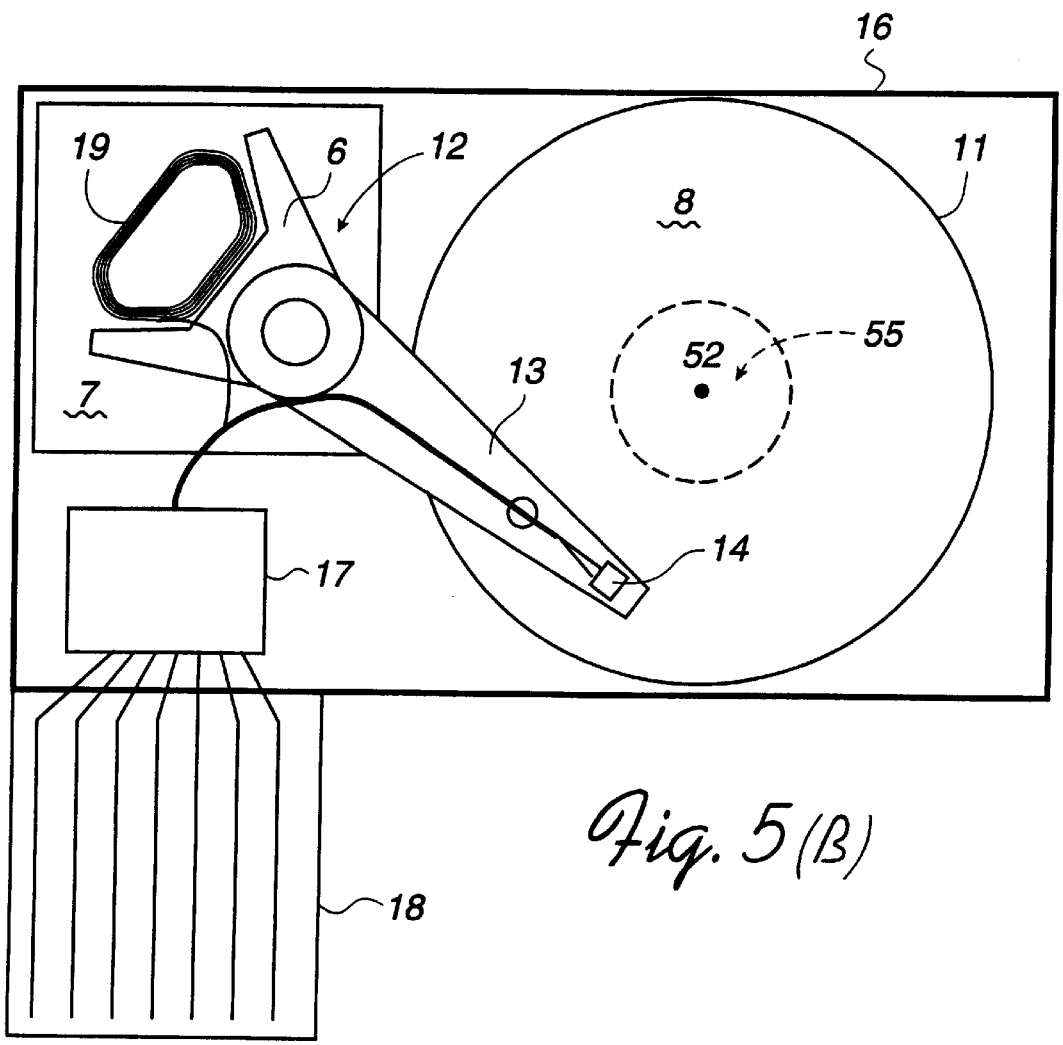
Figure 5C:
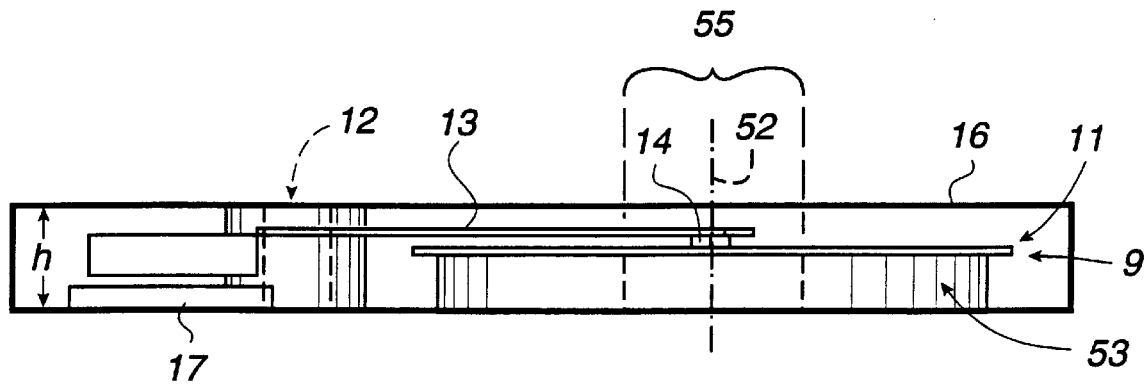
Figure 5D:
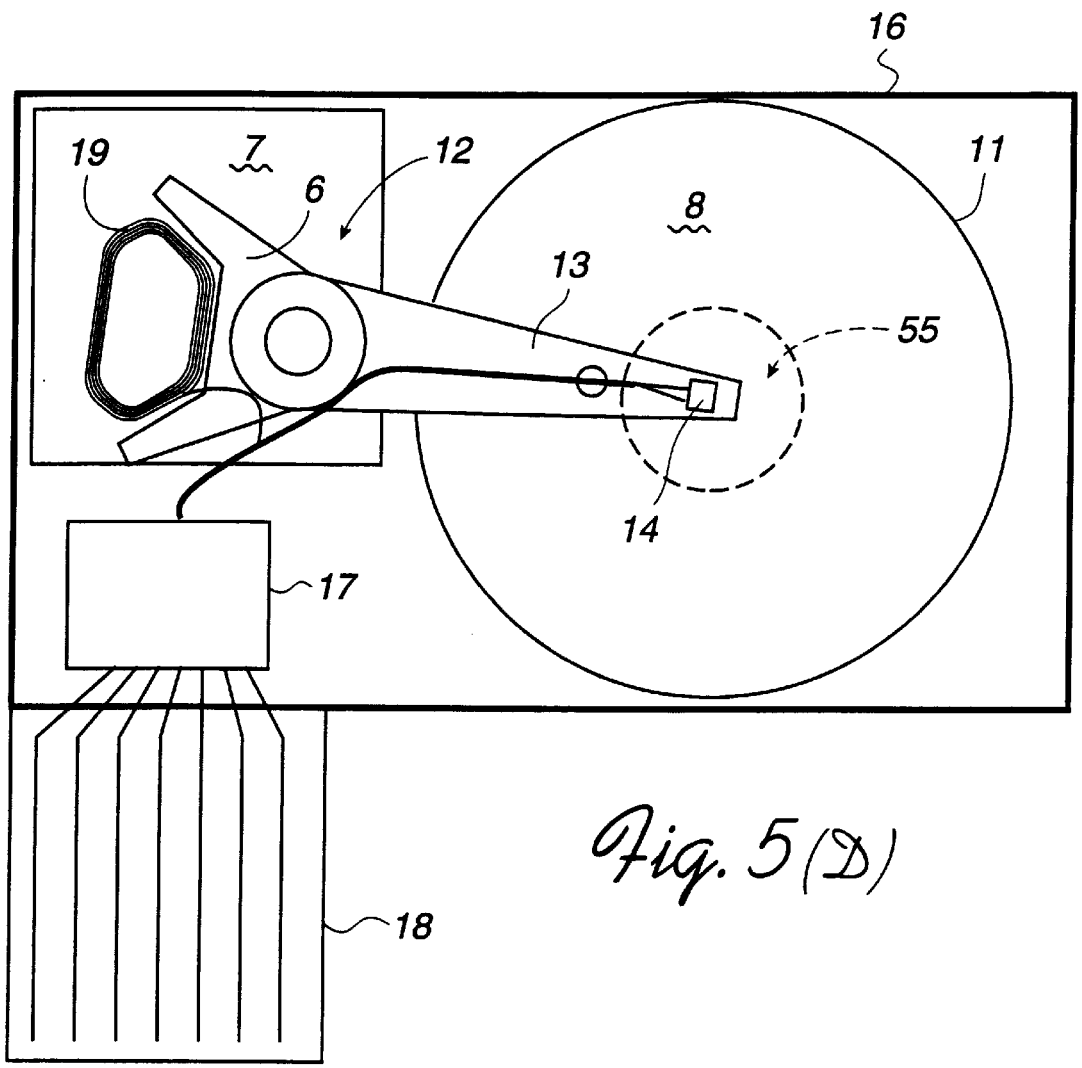

Direct mounting of disk 11 to motor 53 creates an unobstructed region 55 at the disk's center 52 accessible to the actuator assembly 12. The diameter of recording tracks in this region would be too small for practical use, so the region is used for center parking. FIGS. 5(a) and 5(b) show head 14 and suspension 13 positioned over the data recording surface of disk 11. During times of inactivity, the head is "parked" in the central region 55 as shown in FIGS. 5(c) and 5(d) so that head 14 is substantially aligned with the disk center 52. As the slider 14 nears the inner diameter of the disk 11, the upward force of the air flow is reduced and the slider begins to drag along region 55. It is then "parked" at the disk center 52 as shown. Parking structures, e.g. ramps, may be added to the center parking region to facilitate parking. Spacer structures may also be provided between this region and the upper drive housing for added structural support.

The actuator assembly 12 moves the slider back onto the disk surface when necessary by applying a force to overcome the stiction between slider 14 and surface 8. "Stiction" is a term of art for the attractive and frictional forces between slider 14 and surface 8. It is greatest at the outer diameter of the disk and decreases in the direction of the disk center, being essentially reduced to zero at dead center. Since the slider is parked at disk center 52, stiction is virtually nonexistent, and very little force is required to overcome it.

The slider 14 is preferably also center parked during periods when the drive is not operational. When the drive is powered on, the disk 11 spins without any significant stiction impedance. Reduced stiction translates to a reduction in starting torque required from the motor 44. Reduced starting torque in turn leads to a reduction in the electric power requirements of the drive.

As mentioned previously, the preferred embodiment of the component disk drive allows a flatter, wider motor 44 to be used than conventional disk drives requiring hubs. The motor may take a variety of forms. For example, it may be fixed to the disk drive housing or integrated therein. It may have the shape of a disk, or be annular in shape. It may include a hub, and the disk may be mounted directly to the hub, or alternatively, the hub may penetrate the disk and lie substantially flush with the recording surface to preserve actuator access for center parking. An annular motor may surround a stationary hub structure that lies flush with the recording surface to provide a stationary parking zone at disk center.

Those skilled in the art of motor design generally understand that an increase in the diameter of the motor windings increases its moment arm to generate more torque with less force. The motor thus requires less electric current to perform the same operation as a center hub motor. Since the electrical power (P) is proportional to the square of the current, a reduction in the current requirement will result in a large reduction in the electric power requirement as shown below.

$$P = I \times I \times R, \text{ and} \qquad (1)$$

$$I = k/D. \qquad (2)$$

Therefore, $$P = (k \times k \times R)/(D \times D), \qquad (3)$$

where P is the electric power of the motor, I is the electric current used by the motor, D is the motor diameter, R is the electric resistance of the motor, and k is the inversely proportional constant of the motor current to diameter. Applying the above equations, an increase of motor diameter by, for example, a factor of 3 will result in a motor that can achieve the same torque with ⅑th of the power. The motor torque is transmitted directly to the bottom surface of the disk through, for example, an adhesive or a coupling device. Examples of motors that may be used to implement the preferred embodiment include those implemented in the commercially available IBM Travelstar, and the Maxtor MobileMax Lite.

The disk drive assembly 21 of FIG. 4 preferably measures no more than 2 inches in length 72×1.6 inches in width 73×5 mm in height. For example, a 1.3" magnetic disk is mounted to a small, flat motor such as that implemented in Maxtor's MobileMax Lite. (At present there are no flat motors under 5 mm commercially available for implementation in a type II design. However, availability is anticipated in the near future and prototypes are currently being tested.) The actuator assembly is a conventional dual-suspension design such as that used in the Hewlett Packard KITTYHAWK 1.3" drive, modified to have a single suspension with a magnetoresistive head. Modifications required for operability include removal of the lower suspension and any actuator arm height adjustments necessitated by the height of the direct-mounted disk. It may also be desirable to make additional modifications, e.g. reducing the height of the actuator assembly. The manner of making such modifications will be readily apparent to a person of ordinary skill in the operation of disk drive assemblies in view of this specification and the state of the art.

Figure 6:
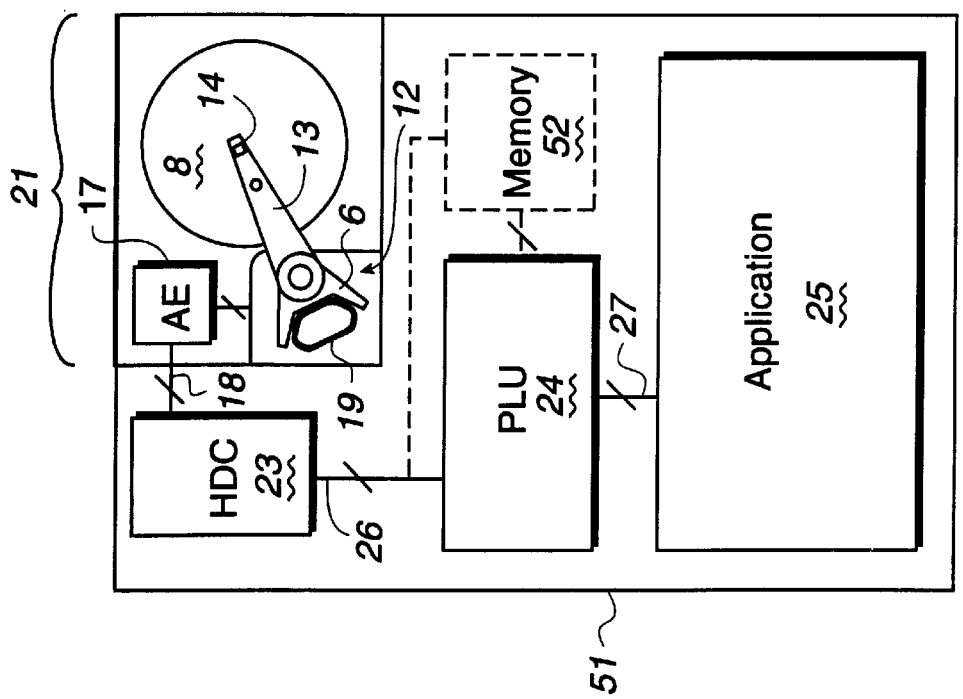
FIG. 6 is a second embodiment of the electronic circuit apparatus of the present invention in a card enclosure.

Referring now to FIG. 6, the disk drive assembly 21 preferably occupies less than 50% of the available card area. The remaining card area is populated by a plurality of electronic components 71 comprising an application subcircuit.

If it later becomes desirable to adapt the card-enclosed apparatus of FIG. 4 to a non-PCMCIA application, e.g. to an application adapted to communicate over an IDE bus, the programmable interface 24 can be reprogrammed in the following manner.

The microcode set defining an IDE interface is stored on the component drive 21. It originates, however, from a designer's logic block diagram or schematic. Popular computer-aided software tools such as ViewDraw are used to construct a logic block diagram. In this case, the diagram will represent an IDE interface option for the disk drive Once the design is simulated, it is synthesized into a serial bitstream of microcode using a compiler program. In this case, a Xilinx tool called XACT generates the bitstream of microcode. For a Xilinx XC4000 FPGA, the microcode set can be 422,128 bits long and make up to 25,000 gates of logic (see diagram on page 2-26 of "The Programmable Logic Data Book") that will allow the disk drive to communicate with an IDE bus in this case. A unique microcode set is similarly generated for each interface application that the PLU 24 will support and is stored inside the component hard disk 21.

The interface change is initiated by some external means (e.g. a selectable switch toggled by a user of the apparatus). This will signal the microprocessor inside the HDC 23 to retrieve the appropriate IDE microcode set from the component drive 21 and will also signal the Xilinx XC4000 PLU 24 to go into a programming state. The microcode set is fed serially from the component disk drive 21, through the HDC 23, and into the PLU 24. Inside the PLU 24, the code is stored in a series of latches. Long chains of latches form the IDE interface to the component disk drive to 21. Once the last information is fed into the PLU 24, the HDC signals the PLU to go into operating mode. This will make the PLU 24 an active interface for the new IDE application.

To enable the drive 21 to communicate with up to ten different interfaces using the Xilinx XC4000 PLU 24, 4,221, 280 bits of storage are required. This translates into about ½ megabyte of data. For the preferred component disk drive of the present invention, this storage space a small fraction of the drivers total storage capacity (typically 20 to 40 MB). Thus, plenty of user storage remains available for storing additional application information.

PLU programming can alternatively be done at the time of manufacture of the device, but it would not have the flexibility of a field programmable drive interface. This approach may be desirable, however, for large-scale manufacturing of a card-based electronic circuit application intended for use in a plurality of external applications requiring different types of interfaces. Under such circumstances, it is desirable to keep as many physical parts of the apparatus in common. In the meantime, the PLU is configured with software to a specific bus architecture. For example, one microcode set would adapt the drive work with an IDE interface, another with a SCSI interface, and another with a PCMCIA interface. The hardware connector on the interface (e.g.—50 pins for SCSI, 68 pins for PCMCIA) might represent the only physical modification required for the various versions.

The above examples represent the simplest form of this invention. Another embodiment includes an application 25 residing within the same enclosure 51 as the component disk drive 21, HDC 23, and PLU 24. The enclosure may be a device or a card such as a PCMCIA type II or type III. The application may comprise, for example, a wireless communication device. In this embodiment of the electronic circuit apparatus, the PLU 24 is actually a functional part of the application 25. Because wireless communications use many different protocols, part of the application circuitry, i.e. the PLU 24, needs to be reconfigured for each different protocol (e.g., one application may be for cellular communications, another for a local area network).

In this case, the PLU 24 is reprogrammed dynamically in the manner described above, but is a functional part of the application 25. The application 25 may contain a digital signal processor (DSP, not shown) to facilitate the waveform-to-digital processing of any communication protocols.

The processor which programs the PLU 24 can be a nonprogrammable reserved area inside the PLU 24. Alternatively, it can be contained inside the HDC 23 as an 8-bit or 16-bit processor such as an AMD 80C186 chip. Alternatively, the processor can be a stand alone chip (not shown) such as the AMD 80C186 which communicates with the HDC 23 and PLU 24. The processor may need some external RAM memory 52 to hold the necessary microcode sets, depending upon the complexity of its function.

Figure 7:
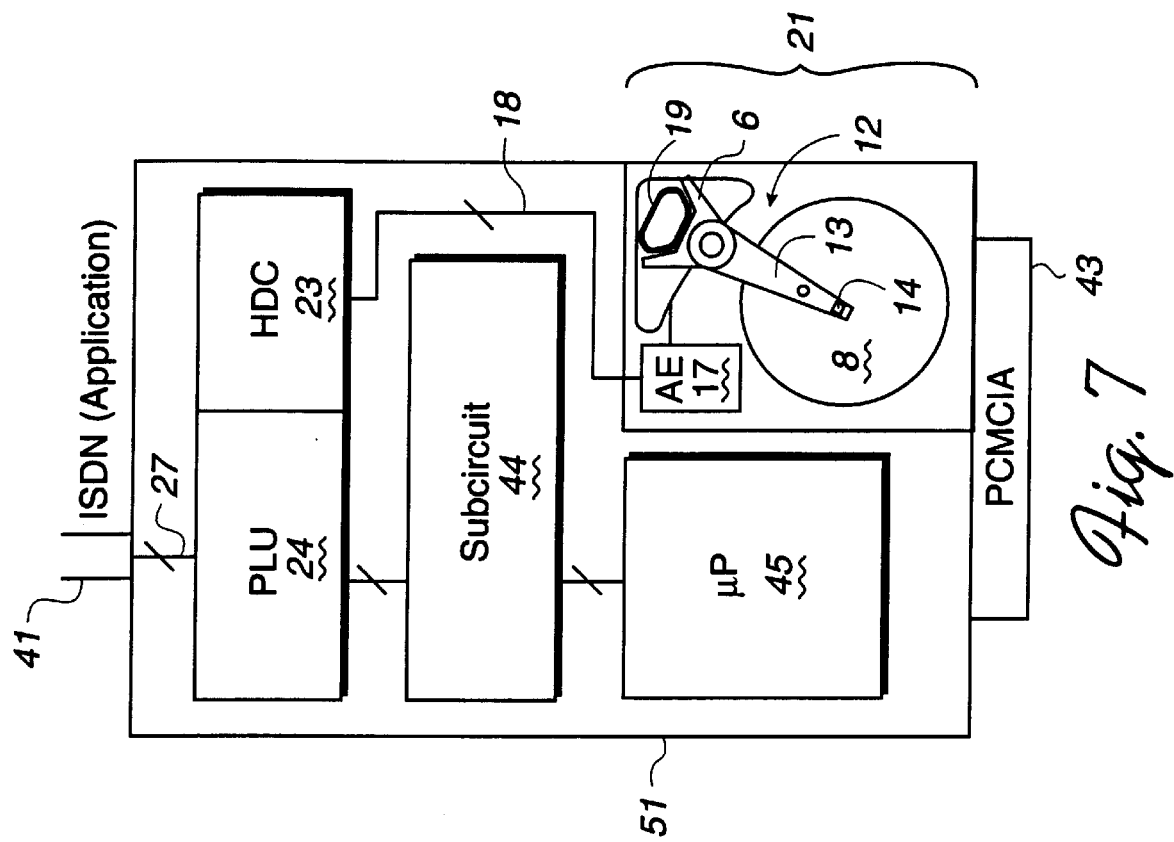
FIG. 7 is a third embodiment of the electronic circuit apparatus of the present invention in a card enclosure.

FIG. 7 shows a third embodiment of the present invention, comprising a component disk drive 21, an HDC 23 merged into a PLU 24 (although it will be understood that the HDC may reside alone or in combination with the arm electronics 17 as previously discussed), and an electronic subcircuit 44 housed in the same enclosure 51. The enclosure 51 is linked to a communications network (not shown) via ISDN bus 27, which connects to a phone line 41. The PLU 24 serves as the interface between the subcircuit 44 and the communications network. The network presumably supports a plurality of different communications protocols, and the PLU adapts the subcircuit 44 to these protocols. Optionally, the enclosure is of a PCMCIA-type and further comprises a PCMCIA connector 43 and a microprocessor 45 such as the AMD 80C186 for providing the interface to the PCMCIA bus. The microprocessor 45 may also be a part of the subcircuit 44. The electronic circuit assembly shown may also optionally include a second programmable interface between the HDC 23 and the subcircuit 44 so that the storage of the component drive is made available to the subcircuit 44.

Although the electronic circuit apparatus of the present invention has been described in terms of specific embodiments, it is to be understood that this disclosure is not to be interpreted as limited to those embodiments shown. Various further alterations and modifications will no doubt become apparent to those skilled in the art after having read the above disclosure. Moreover, the examples provided are not intended to be exhaustive, and the scope of the present invention defined by the following claims is intended.

I claim:

1. An electronic circuit apparatus, comprising:

a disk drive for storing and retrieving information;

disk drive electronics operatively coupled to and supporting operation of said disk drive and including a disk drive controller;

an electronic circuit application having functions unrelated to operation of said disk drive;

a programmable logic unit (PLU) coupled between said disk drive electronics and said electronic circuit application; and means for configuring said FLU as a communications interface between said disk drive electronics and said electronic circuit application, said means for configuring said PLU including a microcode set, means for storing said microcode set, a microprocessor, and means for providing said microcode set to said microprocessor for use in programming said PLU.

2. The electronic circuit apparatus of claim 1, wherein said disk drive controller includes said microprocessor.

3. The electronic circuit apparatus of claim 1, wherein said storing means further comprises a solid state memory component.

4. The electronic circuit apparatus of claim 1, wherein said storing means further comprises said disk drive.

5. The electronic circuit apparatus of claim 4, wherein said disk drive stores a plurality of microcode sets for use in configuring said PLU, each corresponding to a unique bus architecture, and wherein said PLU is dynamically configurable to any one of said bus architectures.

6. The electronic circuit apparatus of claim 1, wherein said disk drive further comprises:
   a disk having a single recording surface;
   means for rotating said disk;
   means for writing information to said one recording surface; and
   means for selectively retrieving a portion of said information from said recording surface.

7. The electronic circuit apparatus of claim 6, wherein said disk drive further comprises a substantially planar region at the center of said recording surface, a transducer for writing information to and retrieving information from said recording surface, and means for parking said transducer at said center of said recording surface.

8. The electronic circuit apparatus of claim 7, wherein said transducer further comprises a magnetoresistive head.

9. The electronic circuit apparatus of claim 6, wherein said means for rotating said disk further comprises a round, flat motor, and wherein said disk is mounted directly on said motor.

10. An electronic circuit apparatus, comprising:
    a disk drive for storing and retrieving information;
    disk drive electronics operatively coupled to and supporting operation of said disk drive and including a disk drive controller;
    an electronic circuit application having functions unrelated to operation of said disk drive;
    a first programmable logic unit (PLU) coupled to said electronic circuit application;
    means for configuring a first PLU as an interface to enable communication by said electronic circuit with an external system, said means for configuring said first PLU including a microcode set, means for storing said microcode set, a microprocessor, and means for providing said microcode set to said microprocessor for use in configuring said first PLU;
    a second PLU operatively coupled between said disk drive electronics and said electronic circuit application, and;
    means for configuring said second PLU as a communications interface between said disk drive electronics and said electronic circuit application, said means for configuring said second PLU including a microcode set, means for storing said microcode set, a microprocessor, and means for providing said microcode set to said microprocessor for use in configuring said second PLU.

11. The electronic circuit apparatus of claim 10, wherein said disk drive controller includes said microprocessor.

12. The electronic circuit apparatus of claim 10, wherein said storing means further comprises a solid state memory component.

13. The electronic circuit apparatus of claim 10, wherein said storing means further comprises said disk drive.

14. The electronic circuit apparatus of claim 10, wherein said disk drive further comprises:
    a disk having a single recording surface;
    means for rotating said disk;
    means for writing information to said one recording surface; and
    means for selectively retrieving a portion of said a information from said recording surface.

15. The electronic circuit apparatus of claim 14, wherein said disk drive further comprises a substantially planar region at the center of said recording surface, a transducer for writing information to and retrieving information from said recording surface, and means for parking said transducer at said center of said recording surface.

16. The electronic circuit apparatus of claim 15, wherein said transducer further comprises a magnetoresistive head.

17. The electronic circuit apparatus of claim 14, wherein said means for rotating said disk further comprises a round, flat motor, and wherein said disk is mounted directly on said motor.

18. The electronic circuit apparatus of claim 10, wherein said electronic circuit application communicates with said external system over a bus.

19. The electronic circuit apparatus of claim 10, wherein said electronic circuit application performs wireless communications with said external system.

20. An electronic circuit apparatus, comprising:
    a disk drive;
    a controller coupled to said disk drive;
    a programmable interface coupled to said controller, said programmable interface capable of being dynamically configured to adapt said electronic circuit apparatus to a selected one of a plurality of communication protocols for communication with an external device, wherein said disk drive is configured to store a plurality of microcode sets, each of said microcode sets corresponding to a unique communication protocol, and wherein said controller is configured to program said programmable interface in response to a selected one of said plurality of microcode sets corresponding to said selected one of said plurality of communication protocols.

21. The electronic circuit apparatus of claim 20, further comprising a housing and a connector, said housing substantially encloses said electronic circuit apparatus, said connector providing a physical interface between said electronic circuit apparatus and said external device.

22. The electronic circuit apparatus of claim 21, wherein said housing provides a PCMCIA-type card enclosure.

23. The electronic circuit apparatus of claim 20, wherein said controller includes a hard disk controller (HDC).

24. The electronic circuit apparatus of claim 23, wherein said HDC resides within said disk drive.

25. The electronic card apparatus of claim 23, wherein said HDC comprises an integrated circuit device.

26. The electronic card apparatus of claim 23, wherein said HDC resides within said programmable interface.

27. The electronic card apparatus of claim 20, wherein said programmable interface is a reprogrammable interface.

28. The electronic card apparatus of claim 20, wherein said programmable interface includes a programmable logic unit, a programmable array logic, a field programmable gate array, or a programmable logic device.

29. The electronic card apparatus of claim 20, further comprising a programming unit coupled to said programmable interface and configured to provide said programmable interface with a selected microcode set corresponding to said selected one of said plurality of communication protocols when programming said programmable interface.

30. The electronic card apparatus of claim 29, wherein said programming unit comprises a microprocessor coupled between a memory device and said programmable interface, wherein said memory device is configured to store a plurality of microcode sets, each of said microcode sets corresponding to a unique communication protocol, and wherein said microprocessor is configured to program said programmable interface in response to said selected microcode set corresponding to said selected one of said plurality of communication protocols.

31. An electronic circuit apparatus, comprising:
a disk drive;
a controller coupled to said disk drive;
an application circuit;
a programmable interface coupled between said controller and said application circuit, said programmable interface capable of being dynamically configured to adapt said application circuit to a selected one of a plurality of communication protocols for communication with said disk-drive, wherein said disk drive is configured to store a plurality of microcode sets, each of said microcode sets corresponding to a unique communication protocol, and wherein said controller is configured to program said programmable interface in response to a selected one of said plurality of microcode sets corresponding to said selected one of said plurality of communication protocols.

32. The electronic circuit apparatus of claim 31, wherein said application circuit is a wireless communications device.

33. The electronic circuit apparatus of claim 31, wherein said application circuit includes a digital signal processor.

34. The electronic circuit apparatus of claim 31, further comprising a housing and a connector, said housing substantially encloses said electronic circuit apparatus, said connector providing a physical interface between said electronic circuit apparatus and an external device.

35. The electronic circuit apparatus of claim 34, wherein said housing provides a PCMCIA-type card enclosure.

36. The electronic circuit apparatus of claim 31, wherein said controller includes a hard disk controller (HDC).

37. The electronic circuit apparatus of claim 36, wherein said HDC resides within said disk drive.

38. The electronic card apparatus of claim 36, wherein said HDC comprises an integrated circuit device.

39. The electronic card apparatus of claim 36, wherein said HDC resides within said programmable interface.

40. The electronic card apparatus of claim 31, wherein said programmable interface is a reprogrammable interface.

41. The electronic card apparatus of claim 31, wherein said programmable interface includes a programmable logic unit, a programmable array logic, a field programmable gate array, or a programmable logic device.

42. The electronic card apparatus of claim 31, further comprising a programming unit coupled to said programmable interface and configured to provide said programmable interface with a selected microcode set corresponding to said selected one of said plurality communication protocols when programming said programmable interface.

43. The electronic card apparatus of claim 42, wherein said programming unit comprises a microprocessor coupled between a memory device and said programmable interfaces wherein said memory device is configured to store a plurality of microcode sets, each of said microcode sets corresponding to a unique communication protocol, and wherein said microprocessor is configured to program said programmable interface in response to said selected microcode set corresponding to said selected one of said plurality of communication protocols.

44. An electronic circuit apparatus, comprising:
a disk drive;
a controller coupled to said disk drive;
a subcircuit;
a first programmable interface coupled to said controller and said subcircuit, said programmable interface capable of being dynamically configured to adapt said electronic circuit apparatus to a selected one of a plurality of communications protocols for communication with an external device;
a second programmable interface coupled to said subcircuit, said second programmable interface capable of being dynamically configured to adapt said subcircuit to a second selected one of a plurality of communication protocols for communication with said disk drive.

45. The electronic circuit apparatus of claim 44, further comprising a housing and a connector, said housing substantially encloses said electronic circuit apparatus, said connector providing a physical interface between said electronic circuit apparatus and said external device.

46. The electronic circuit apparatus of claim 45, wherein said housing provides a PCMCIA-type card enclosure.

47. The electronic circuit apparatus of claim 44, wherein said controller includes a hard disk controller (HDC).

48. The electronic circuit apparatus of claim 47, wherein said HDC resides within said disk drive.

49. The electronic card apparatus of claim 47, wherein said HDC comprises an integrated circuit device.

50. The electronic card apparatus of claim 47, wherein said HDC resides within said programmable interface.

51. The electronic card apparatus of claim 44, wherein at least one of said programmable interface and said second programmable interface is a reprogrammable interface.

52. The electronic card apparatus of claim 44, wherein at least one of said programmable interface and said second programmable interface includes a programmable logic unit, a programmable array logic, a field programmable gate array, or a programmable logic device.

53. The electronic card apparatus of claim 44, further comprising a programming unit coupled to said programmable interface and configured to provide a selected microcode set corresponding to said selected one of said plurality of communications protocols to said programmable interface when programming said programmable interface.

54. The electronic card apparatus of claim 44, further comprising a programming unit coupled to said second programmable interface and configured to provide said second selected microcode set corresponding to said second selected one of said plurality of communication protocols to said second programmable interface when programming said second programming interface.

55. The electronic card apparatus of claim 53, wherein said programming unit comprises a microprocessor coupled between a memory device and said programmable interface, wherein said memory device is configured to store a plurality of microcode sets, each of said microcode sets corresponding to a unique communication protocol, and wherein said microprocessor is configured to program said programmable interface in response to said selected microcode set corresponding to said selected one of said plurality of communication protocols.

56. The electronic card apparatus of claim 54, wherein said programming unit comprises a microprocessor coupled between a memory device and said second programmable interface, wherein said memory device is configured to store a plurality of microcode sets, each of said microcode sets corresponding to a unique communication protocol, and wherein said microprocessor is configured to program said second programmable interface in response to said second selected microcode set corresponding to said second selected one of said plurality of communication protocols.

57. The electronic card apparatus of claim 44, wherein said disk drive is configured to store a plurality of microcode sets, each of said microcode sets corresponding to a unique communication protocol, and wherein said controller is configured to program said programmable interface in response to a selected one of said plurality of microcode sets corresponding to said selected one of said communication protocols.

58. The electronic card apparatus of claim 44, wherein said disk drive is configured to store a plurality of microcode sets, each of said microcode sets corresponding to a unique communication protocol, and wherein said controller is configured to program said second programmable interface in response to said second selected one of said plurality of microcode sets corresponding to said selected one of said communication protocols.

* * * * *

UNITED STATES PATENT AND TRADEMARK OFFICE
CERTIFICATE OF CORRECTION

PATENT NO. : 5,918,068 Page 1 of 1
DATED : June 29, 1999
INVENTOR(S) : Mathew K. Shafe'

It is certified that error appears in the above-identified patent and that said Letters Patent is hereby corrected as shown below:

Column 1,
Line 28, after "other" insert -- essential --

Column 9,
Line 21, after "drive" delete "to"
Line 43, after "drive" insert -- to --

Column 10,
Line 51, delete "FLU" and insert -- PLU --

Signed and Sealed this

Twenty-ninth Day of June, 2004

JON W. DUDAS
*Acting Director of the United States Patent and Trademark Office*